US 8,275,581 B2

(12) United States Patent
Corry et al.

(10) Patent No.: US 8,275,581 B2
(45) Date of Patent: Sep. 25, 2012

(54) MANAGING STATISTICAL PROFILE DATA

(75) Inventors: Kevin Michael Corry, Pflugerville, TX (US); Mark Alan Peloquin, Austin, TX (US); Steven Pratt, Leander, TX (US); Karl Milton Rister, Austin, TX (US); Andrew Matthew Theurer, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 767 days.

(21) Appl. No.: 12/354,178

(22) Filed: Jan. 15, 2009

(65) Prior Publication Data

US 2010/0180158 A1 Jul. 15, 2010

(51) Int. Cl.
*G06F 11/34* (2006.01)
*G06F 17/30* (2006.01)
(52) U.S. Cl. ........................................ 702/186; 702/182

(58) Field of Classification Search .................. 702/182, 702/186; 714/38, 38.14, E11.197; 707/E17.014
See application file for complete search history.

(56) References Cited

U.S. PATENT DOCUMENTS

| 5,544,359 | A | 8/1996 | Tada et al. | |
|---|---|---|---|---|
| 7,509,234 | B2 * | 3/2009 | Unnikrishnan et al. | ...... 702/183 |
| 2006/0161816 | A1 | 7/2006 | Gula et al. | |
| 2007/0043531 | A1 * | 2/2007 | Kosche et al. | ................ 702/182 |

FOREIGN PATENT DOCUMENTS

JP 08106408 4/1996
* cited by examiner

*Primary Examiner* — Sujoy Kundu
(74) *Attorney, Agent, or Firm* — Yee & Associates, P.C.; Steven L. Bennett

(57) ABSTRACT

Statistical profile data is refined by interrupting an execution of a software program in response to detecting a profiling event during the execution of the software program. An event sample associated with the profiling event is recorded in a log file. A set of markers describing and associated with the event sample is inserted into the log file.

24 Claims, 4 Drawing Sheets

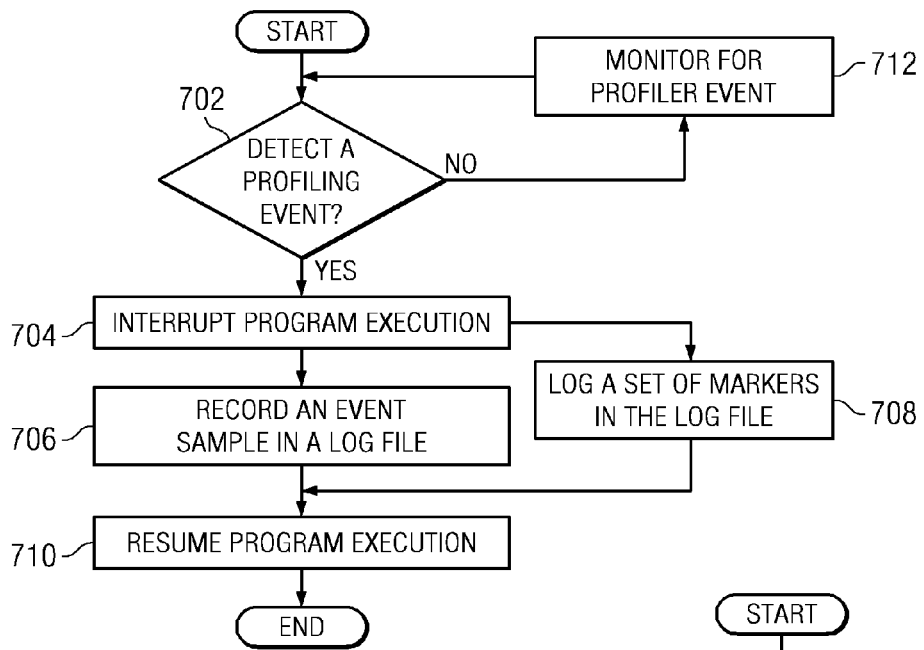
FIG. 7
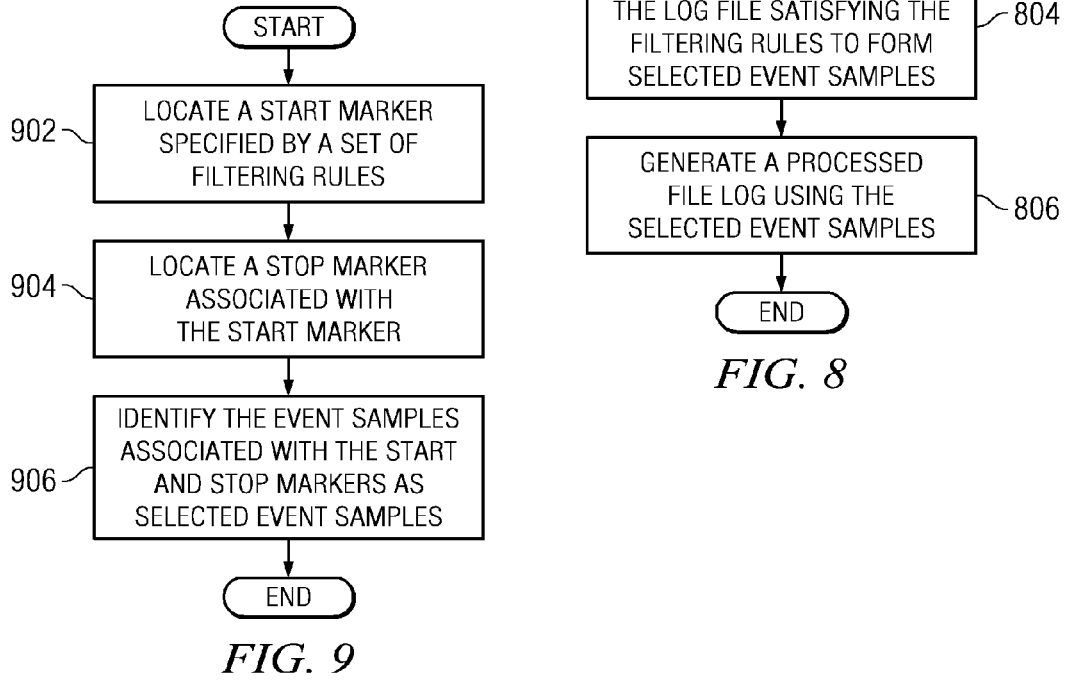
FIG. 8
FIG. 9

MANAGING STATISTICAL PROFILE DATA

BACKGROUND OF THE INVENTION

1. Field of the Invention

The present invention is related generally to a data processing system and in particular to a method and apparatus for managing data. More specifically, the present invention is directed to a computer implemented method, apparatus, and computer usable program code for managing statistical profile data by implementing a set of markers that may be referenced for filtering selected profile samples.

2. Description of the Related Art

Statistical profiles are performance analysis tools that measure the behavior of a data processing system and/or the applications hosted thereon. Generally, statistical profilers measure where the central processing unit is spending its cycles on a function-by-function or task-by-task basis. Techniques used to collect profiles or the set of profile samples include hardware interrupts, code instrumentation, operating system hooks, and performance counters. The output from a statistical profiler is a stream of recorded events, also referred to as a trace or a set of profile samples. The output may also be a statistical summary of the events observed, also referred to as a profile.

System profilers fall into two classes: those that report actual or exact measurements and those that report statistical data. Both methods provide important information and the decision about which type to use will depend on the purpose of the analysis. Notwithstanding this fact, statistical profilers measure how much time the processor spends executing various parts of the software. Profiling tools can be software-based, hardware-based or a combination of hardware and software. Much like a logic analyzer, a profiler can display information such as kernel calls, hardware interrupts, thread states, messages, and scheduling activities. System profilers provide information necessary to reveal bottlenecks, optimize performance, and most importantly, understand what the processor is really doing.

Profilers have some limitations. Some may impact performance or may require special hardware. Others function as post-processors, making it difficult to correlate their results with dynamic loads. Generally, such limitations are minor. The greatest challenge is making sense out of the enormous amount of data that profilers can collect. To address this, most profilers provide automated analysis and sophisticated graphing capabilities that make it possible to visualize events and quickly and easily pinpoint problems.

Statistical profilers work by periodically sampling system data, such as function call stacks, central processing unit registers, or memory addresses and data signals as a means of tracking the path of program execution. Statistical data is required to measure the relative impact of highly repetitive events or activities. An example of this would be the percentage of central processing unit time utilized by a particular task or function.

The data collected by statistical profilers are aggregated in a file log. However, event samples collected over time often include data irrelevant to specific performance issues. Thus, statistical reports generated from such a file log may include unrelated event data that may prevent a user from identifying causes of the performance issues at hand.

BRIEF SUMMARY OF THE INVENTION

According to one embodiment of the present invention, the process interrupts an execution of a software program in response to detecting a profiling event during the execution of the software program. The process then records an event sample associated with the profiling event. The event sample is recorded in a log file. The process also inserts a set of markers describing and associated with the event sample into the log file. The process then resumes the execution of the software program.

BRIEF DESCRIPTION OF THE SEVERAL VIEWS OF THE DRAWINGS

FIG. 7 is a flowchart of a process for generating a log file in accordance with an illustrative embodiment;

FIG. 8 is a flowchart of a process for generating a processed file log in accordance with an illustrative embodiment; and FIG. 9 is a flowchart of a process for identifying event samples from a log file in accordance with an illustrative embodiment.

DETAILED DESCRIPTION OF THE INVENTION

Figure 1:
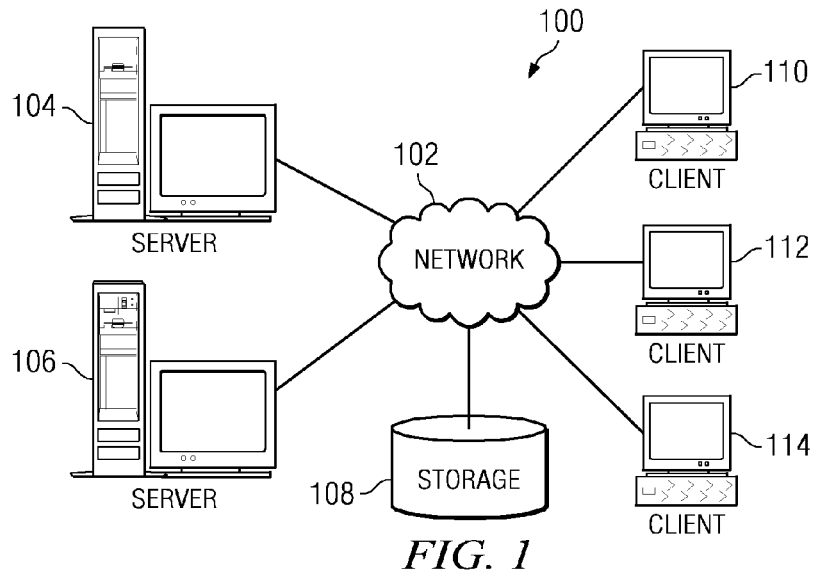
FIG. 1 is a pictorial representation of a network of data processing systems in which illustrative embodiments may be implemented.

As will be appreciated by one skilled in the art, the present invention may be embodied as a system, method, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, the present invention may take the form of a computer program product embodied in any tangible medium of expression having computer usable program code embodied in the medium.

Any combination of one or more computer usable or computer readable medium(s) may be utilized. The computer usable or computer readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including, but not limited to wireless, wireline, optical fiber cable, RF, etc.

Computer program code for carrying out operations of the present invention may be written in any combination of one or more programming languages, including an object oriented programming language such as Java, Smalltalk, C++, or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 2:
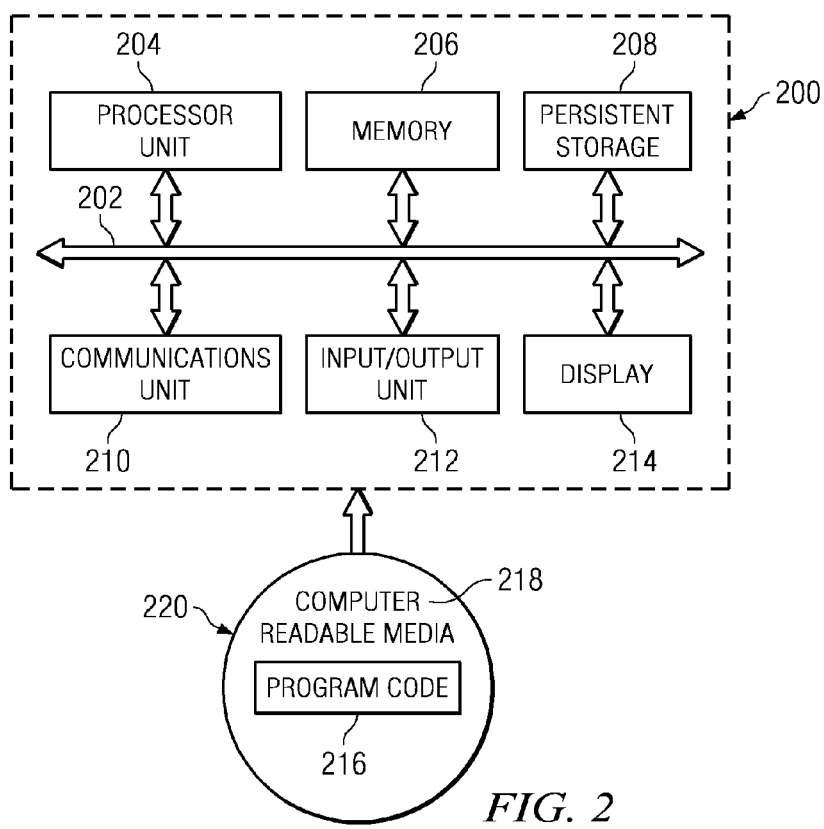
FIG. 2 is a block diagram of a data processing system in which illustrative embodiments may be implemented.

With reference now to the figures, and in particular, with reference to FIGS. 1 and 2, exemplary diagrams of data processing environments are provided in which illustrative embodiments may be implemented. It should be appreciated that FIGS. 1 and 2 are only exemplary and are not intended to assert or imply any limitation with regard to the environments in which different embodiments may be implemented. Many modifications to the depicted environments may be made.

FIG. 1 depicts a pictorial representation of a network of data processing system in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown. In an illustrative example, a user may implement a statistical profiler in a client computer, such as client 110, for measuring the performance of the client computer during the execution of one or more software programs. The statistical profiler may gather a set of event samples derived from the execution of the one or more software programs. In addition, the statistical profiler may log a set of markers associated with the set of event samples. The set of markers may be referenced by a post-processor component for identifying selected profile samples. The selected profile samples, which may be a subset of the set of event samples, may then facilitate an analysis of the operation of the client computer and/or the software program.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational, and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments.

In this illustrative example, data processing system 200 includes communications fabric 202, which provides communications between processor unit 204, memory 206, persistent storage 208, communications unit 210, input/output (I/O) unit 212, and display 214. Processor unit 204 serves to execute instructions for software that may be loaded into memory 206. Processor unit 204 may be a set of processors. As used herein, the term "set" may refer to one or more. Thus, a set of processors may be one or more processors. In addition, processor unit 204 may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206, in these examples, may be, for example, a random access memory or any other suitable volatile or non-volatile storage device. Persistent storage 208 may take various forms depending on the particular implementation. For example, persistent storage 208 may contain one or more components or devices. In another example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown.

As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Data collected by statistical profilers are aggregated in a log file. However, event samples collected over time often include data irrelevant to specific performance issues. Thus, statistical reports generated from such a file log may include unrelated event data that may prevent a user from identifying causes of the performance issues at hand. The profile characteristics of a data processing system from which the statistical report is generated may be skewed or otherwise inaccurate.

Therefore, the illustrative embodiments provide a computer implemented method, apparatus, and computer program product for managing event samples and system profile data. In one embodiment, the process interrupts an execution of a software program in response to detecting a profiling event during the execution of the software program. The process then records an event sample associated with the profiling event. The event sample is recorded in a log file. The process also inserts a set of markers describing and associated with the event sample into the log file. The process then resumes the execution of the software program.

Figure 3:
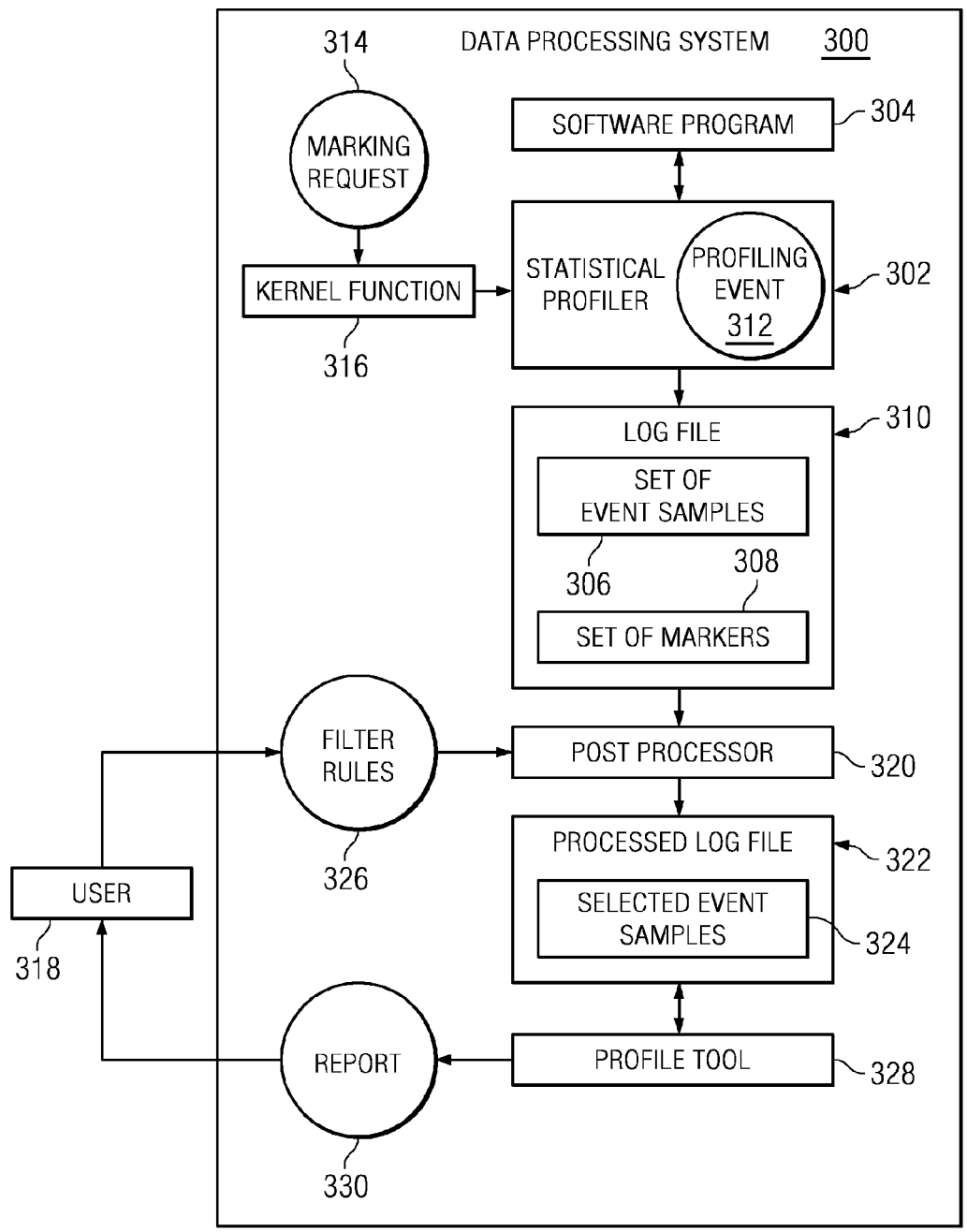
FIG. 3 is a block diagram of a data processing system for managing statistical profile data in accordance with an illustrative embodiment.

FIG. 3 is a block diagram of a data processing system for refining and managing statistical profile data. Data processing system 300 may be a computing device such as server 104 or client 110 in FIG. 1.

Data processing system 300 includes statistical profiler 302. Statistical profiler 302 is a software component for collecting and storing data generated during the execution of software program 304. Software program 304 is one or more programs that may be hosted and/or executed on data processing system 300. The data generated during the execution of software program 304 may include, for example, a frequency and duration of function calls. The data may be collected using any known or later developed data collection techniques, including, for example, hardware interrupts, code instrumentation, operating system hooks, and performance counters. Examples of statistical profiler 302 may include, without limitation, Oprofile, a system wide statistical profiler for Linux operating system and gprof, a user-space profiler for UNIX applications.

As the software program 304 executes, data is collected by statistical profiler 302 and is stored as set of event samples 306. Set of event samples 306 may include, without limitation, a description of a program execution location at the time of collection and a program's process identifier. For example, statistical profiler 302 may collect set of event samples 306 describing an execution location of software program 304 when statistical profiler 302 is triggered to generate set of event samples 306. In addition, set of event samples 306 may include a process identifier identifying a process of software program 304 that was executing when statistical profiler 302 generated set of event samples 306.

Statistical profiler 302 also inserts (logs) set(s) of markers 308 into the log file 310. A set of markers 308 is one or more markers associated with event samples from set of event samples 306. Set of markers 308 may then be used to identify selected event samples from set of event samples 306. Each marker in a set of markers 308 may include a header identifying the marker in a log file as a marker. In addition, each marker in a set of markers 308 may include a description field for storing metadata describing the event sample to which the marker is associated. The metadata may include, for example, identification identifying whether the marker is a start marker or a stop marker, an event type associated with the marker, a timestamp, or any other type of data that may be used for tagging event samples in set of event samples 306. A more detailed description of markers is provided in connection with FIG. 4.

A set of markers 308 are inserted into the log file 310 at the same time that an event sample is recorded in the log file. The set of markers are inserted at the request of a kernel function, and may come from a kernel subsystem, such as an I/O subsystem, memory manager, which will ask the statistical profiler 302 to log a marker, for example, marker "memory allocation begin" or "memory allocation end." Alternatively, a program running requests a marker to be logged, for example, "database transaction #1234 begin". The program will have to request the kernel to do this: a) program requests a marker with a system call; b) kernel gets a system call, then asks profiler to log this marker.

Because the statistical profiler is logging both types of data (event and markers), the log file contains this data interleaved in the order they occur. Thus, a set of markers describing an event sample is associated with the event sample.

Set of event samples 306 and set of markers 308 are stored in log file 310. Log file 310 is a data structure stored in a storage device, such as, for example, a portable computer diskette, a hard disk, a random access memory (RAM), a read-only memory (ROM), an erasable programmable read-only memory (EPROM or Flash memory), a portable compact disc read-only memory (CDROM), an optical storage device, or a magnetic storage device. The log file 310 may be a list, a database, an array, a table, or any other type of data structure.

In an illustrative embodiment, statistical profiler 302 associates a pair of markers from set of markers 308 with a selected set of event samples 306. The first marker of the pair of markers indicates a starting point in log file 310 of the selected event samples. The second marker of the pair of markers indicates an ending point of the selected event samples in log file 310. In this manner, the pair of markers forms bookends for identifying the selected event samples. Subsequent searches of the log file 310 may be performed by searching for pairs of specified markers. Once the specified pairs of markers are located, then the associated event samples may be selected for subsequent processing. In an alternate embodiment, more or fewer markers may be associated with selected event samples from set of event samples 306.

For example, statistical profiler 302 may collect a set of event samples 306 during a direct memory access (DMA) from a hard disk of data processing system 300. Before set of event samples 306 is recorded, statistical profiler 302 may store in the log file 310 a first marker including a description field indicating that the first marker is a DMA start marker. Statistical profiler 302 may then collect and store set of event samples 306 relating to the direct memory access event immediately behind the DMA start marker. After the direct memory access event is completed, statistical profiler 302 may then store in log file 310 a second marker. The second marker may include a description field indicating that the second marker is a DMA end marker. The pair of markers, the DMA start marker and the DMA end marker, encloses the set of event samples 306 to enable subsequent identification of the set of event samples 306 by searching for the pair of DMA markers. The pairs of markers may also include a timestamp field. The timestamp field may enable a filtering component of data processing system 300 to select event samples that were collected within a specified period of time. Markers are discussed in more detail in connection with FIG. 4.

Statistical profiler 302 generates set of event samples 306 in response to detecting profiling event 312. A profiling event 312 is a condition or occurrence that is created and detected during the execution of software program 304. A profiling event 312 may be, for example, a threshold occurrence of a timer tick, a cache miss, a memory access, or a translation lookaside buffer miss. Thus, for example, if during the execution of software program 304, statistical profiler 302 detects a threshold number of cache misses, then statistical profiler 302 may generate a set of event samples 306 identifying the execution location of software program 304 during the cache miss. In addition, statistical profiler 302 may include in the set of event samples 306 a process identifier to identify the process of software program 304 that was executing when the threshold cache miss was detected.

In an alternate embodiment, profiling event 312 may also be the receipt of marking request 314. Marking request 314 is a request for injecting a marker into the log file 310. The statistical profiler 302 receives a marking request 314 from kernel function 316. Kernel function 316 may forward marking request 314 to the statistical profiler 302 in response to receiving marking request 314 from software running on data processing system 300, which, for example, may be software program 304. In particular, software program 304 may be a browser operated by user 318. Software program 304 may send marking request 314 to kernel function 316 in the form of a system call. Software program 304 may send the system call to kernel function 316 in response to input received from user 318. In another example, where software program 304 is an operating system, marking request 314 may be a request generated by software program 304 on its own accord during execution. Marking request 314 may then be transmitted to kernel function 316. Thereafter, kernel function 316 may, if necessary, reformat marking request 314 or simply forward marking request 314 to statistical profiler 302. Once a marking request 314 is received, the statistical profiler 302 collects and stores a set of event samples 306. In addition, statistical profiler 302 also generates and stores a set of markers 308 into the log file 310 in response to receiving a marking request 314.

Data processing system 300 includes post processor 320. Post processor 320 is a software component for processing the log file 322. In particular, post processor 320 processes the log file 310 to produce the processed log file 322. The processed log file 322 is a log file similar in structure to log file 310. The processed log file 322 includes selected event samples 324. Selected event samples 324 are event samples selected from the set of event samples 306. The post processor 320 selects event samples from the set of event samples 306 according to the filter rules 326.

Filter rules 326 are rules for searching and locating markers from the set of markers 308. By identifying and locating markers, the post processor 320 may locate specific event samples from the log file 310 to form selected event samples 324. Filter rules 326 may specify any type of information included in the set of markers 308. The post processor 320 may then search the log file for markers satisfying filter rules 324. For example, filter rules may specify an event type, such as a cache miss. The post processor 320 may search for and locate all markers associated with cache misses. A marker may be associated with a cache miss by including, in a description portion of the marker, a reference to a cache miss. The description portion of the marker is discussed in more detail in connection with FIG. 4.

Data processing system 300 also includes a profile tool 328. Profile tool 328 is a software component for generating report 330 from selected event samples 324 stored in processed log file 322. The profile tool 328 may perform statistical analysis or other forms of data processing. The profile tool 328 may be, for example, the Linux operating system's Oprofile opreport tool.

The profile tool 328 generates a report 330. Report 330 presents profile characteristics of data processing system 300. The report 330 may be referenced by a user 318 to determine the state of operation of data processing system 300. The report 330 may include, for example, information displaying the number of samples and a percentage (vs total number of samples) for each function in each running program and/or operating system kernel found in the profiler log.

Figure 4:
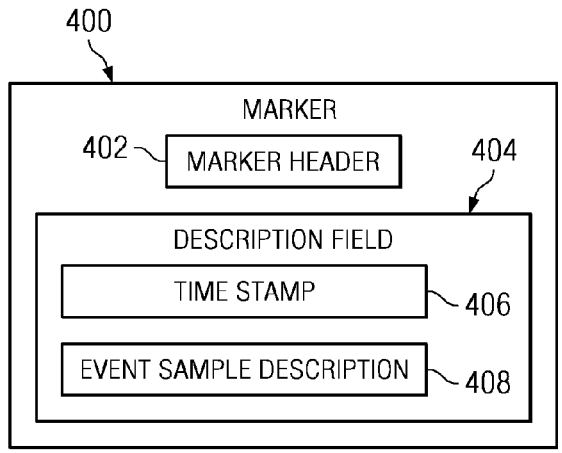
FIG. 4 is a block diagram of marker in accordance with an illustrative embodiment.

FIG. 4 is a block diagram of a marker in accordance with an illustrative embodiment. Marker 400 is a marker from the set of markers 308 in FIG. 3.

Marker 400 includes a marker header 402. Marker header 402 is an identifier that identifies marker 400 as a marker. Marker header 402 may be an alphanumeric string of text that serves to differentiate marker 400 from set of event samples 306 in log file 310. For example, marker header 402 may be a string of text spelling the word "marker."

Marker 400 also includes description field 404. Description field 404 is a field of marker 400 that stores metadata describing the selected event samples to which marker 400 is associated. In the illustrative embodiment in FIG. 4, description field 404 includes timestamp 406. Timestamp 406 is a field storing data indicating a date and/or time that marker 400 is added to a log file, such as log file 310 in FIG. 3. For example, if marker 400 is a start marker, then timestamp 406 includes a value signifying the date and/or time that marker 400 was added to a log file.

Description field 404 also includes event sample description 408. Event sample description 408 is a field storing data describing the selected event samples associated with marker 400. For example, if marker 400 is a start marker associated with a direct memory access event, then event sample description field 408 may include the following string of text: DMA_StartMarker. A corresponding stop marker may include an event sample description field having the description: DMA_StopMarker. The placement of marker 400 and its corresponding end marker in a log file act as bookends to set apart a direct memory access event in the log file. A post processor, such as post processor 320 in FIG. 3, may then locate specific markers to generate a processed log file, such as processed log file 322 in FIG. 3. Not only can the post processor locate markers relating to a particular event or condition, such as a direct memory access event, the post processor can locate a particular event occurring within a specified time period by referencing data stored in timestamp 406.

Although description field 408 is shown as including only timestamp 406 and event sample description 408, description field 408 may include other data types and categories of information. For example, description field 408 may also include, without limitation, a process identifier, a processor identifier, or any other relevant data that describes the event samples associated with marker 400.

Figure 5:
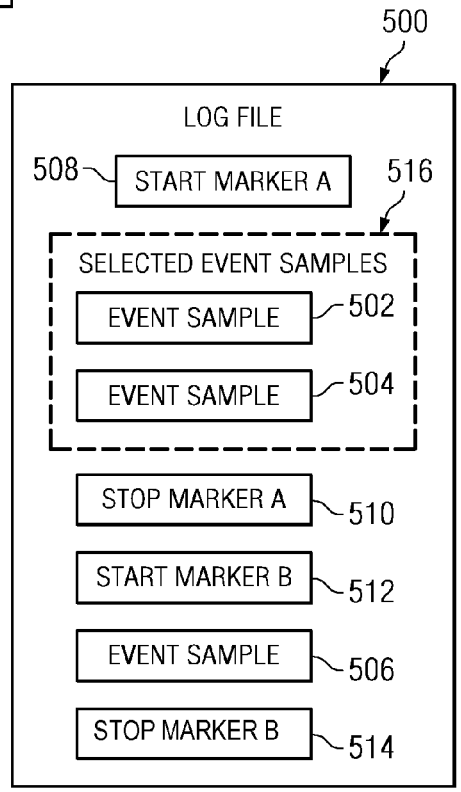
FIG. 5 is a block diagram of a log file in accordance with an illustrative embodiment.

FIG. 5 is a block diagram of a log file in accordance with an illustrative embodiment. Log file 500 is a log file such as log file 310 in FIG. 3. Log file 500 includes a set of event samples collected by a statistical profiler such as statistical profiler 302 in FIG. 3. In particular, the set of event samples in FIG. 5 is a set of event samples such as set of event samples 306 in FIG. 3. In particular, the set of events in FIG. 5 include event samples 502, 504, and 506.

Log file 500 also includes a set of markers such as set of markers 308 in FIG. 3. The set of markers in log file 500 include start marker A 508, stop marker A 510, start marker B 512, and stop marker B 514.

Start marker A 508 and stop marker A 510 are associated with event samples 502 and 504. In particular, start marker A 508 and stop marker A 510 are associated with event samples 502 and 504 by forming bookends that delineate a start position and a stop position in log file 500. Similarly, start marker B 512 and stop marker B 514 are associated with event sample 506.

A post processor, such as post processor 320 in FIG. 3, processes log file 500 to generate a processed log file including only selected profile samples. The selected profile samples are identified by a set of filter rules, such as filter rules 326 in FIG. 3. In an illustrative example, a post processor receives filter rules for generating the processed log file. The filter rules identify start marker A 508. The post processor locates start marker A 508 and stop marker A 510. The post processor then identifies the event samples associated with start marker A 508 and stop marker A 510. In this example, the post processor identifies event samples 502 and 504 as selected event samples 516. The post processor may then generate a processed log file including only selected event samples 516. The resultant processed log file is depicted in FIG. 6.

Figure 6:
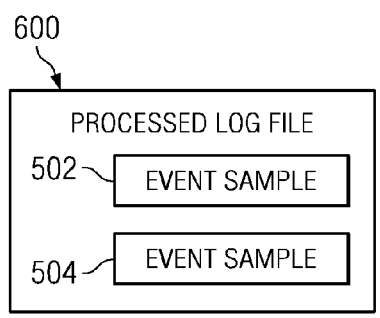
FIG. 6 is a block diagram of a processed log file in accordance with an illustrative embodiment.

FIG. 6 is a block diagram of a processed log file in accordance with an illustrative embodiment. Processed log file 600 is a processed log file such as processed log file 322 in FIG. 3.

Processed log file 600 is generated from selected event samples 516 in FIG. 5. Thus, processed log file 600 includes event samples 502 and 504. A profile tool such as profile tool 328 in FIG. 3 may then generate from processed log file 600 a report such as report 330 in FIG. 3.

FIG. 7 is a flowchart of a process for collecting event samples in accordance with an illustrative embodiment. The process depicted in FIG. 7 may be implemented by a software component such as statistical profiler 302 in FIG. 3.

The process begins by detecting a profiling event (step 702). The profiling event is a profiling event such as profiling event 312 in FIG. 3. The profiling event is detected during the execution of a software program such as software program 304 in FIG. 3.

If the process makes the determination that a profiling event is detected, then the process interrupts the program's execution (step 704). The process then records an event sample in a log file (step 706), and, at the same time, the process inserts a set of markers describing the event sample in the log file (step 708). The process then resumes the execution of the software program (step 710). The process terminates thereafter.

Returning to step 702, if the process makes the determination that a profiling event has not been detected, then the process monitors for the profiling event (step 712) and returns to step 702.

FIG. 8 is a flowchart of a process for generating a processed log file in accordance with an illustrative embodiment. The process in FIG. 8 may be implemented by a software component such as post processor 320 in FIG. 3.

The process begins by searching a log file using a set of filtering rules (step 802). The filtering rules are filtering rules such as filter rules 326 in FIG. 3.

The process then identifies event samples from the log file satisfying the filtering rules to form selected event samples (step 804). The selected event samples are selected event samples such as selected event samples 516 in FIG. 5. Thereafter, the process generates a processed file log using the selected event samples (step 806), and the process terminates. The processed file log is a processed file log such as processed log file 322 in FIG. 3.

FIG. 9 is a flowchart of a process for identifying selected event samples in accordance with an illustrative embodiment. The process depicted in FIG. 9 may be implemented in a software component such as statistical profiler 302 in FIG. 3.

The process begins by locating a start marker specified by a set of filtering rules (step 902). The set of filtering rules is a set of filtering rules such as filter rules 326 in FIG. 3. The process then locates a stop marker associated with the start marker (step 904). Thereafter, the process identifies the event samples associated with the start marker and the stop marker as selected event samples (step 906) and the process terminates.

Thus, the illustrative embodiments disclosed herein provide a computer implemented method, apparatus, and computer program product for refining statistical profile data. In one embodiment, the process interrupts an execution of a software program in response to detecting a profiling event during the execution of the software program. The process then records an event sample associated with the profiling event. The event sample is recorded in a log file. The process also inserts a set of markers describing the event sample into the log file and associated with the event sample. The process then resumes the execution of the software program.

The illustrative embodiments disclosed herein enable the generation of a processed log file that includes only selected event samples. The selected event samples are event samples from a set of event samples that satisfy filtering rules. The filtering rules enable a user to restrict the content of the processed log file to include event samples that pertain to a selected event or condition, or which occur within a specified time period. In this manner, a user may select only those events of interest and omit event samples that may dilute a statistical profile with unimportant or unnecessary information.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories, which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for generating data in a log file, the computer implemented method comprising:
   a computer, responsive to a detection of a profiling event during an execution of a software program, interrupting the execution of the software program;
   the computer recording an event sample associated with the profiling event, wherein the event sample is recorded in the log file, and wherein the log file comprises a set of event samples;
   the computer inserting a set of markers comprising information describing the event sample into the log file, wherein the set of markers are associated with the event sample; and
   the computer resuming the execution of the software program.

2. The computer implemented method of claim 1, wherein the recording and the inserting are performed at the same time.

3. The computer implemented method of claim 2, wherein inserting a set of markers comprising information describing the event sample into the log file, comprises
   the computer interleaving the set of markers with event samples of the set of event samples in the log file.

4. The computer implemented method of claim 1, wherein the event sample comprises one of a description of a program execution location at a time of collection, and a program's process identifier.

5. The computer implemented method of claim 1, wherein a marker of the set of markers comprises:
   a marker header that identifies the marker as being a marker; and
   a description field describing the event sample with which the marker is associated.

6. The computer implemented method of claim 5, wherein the description field comprises:
   a timestamp indicating a date and/or time that the marker was inserted into the log file; and
   an event sample description storing data describing the event sample associated with the marker.

7. A computer program product, comprising:
   a non-transitory computer recordable-type medium storing program instructions for generating data in a log file, the computer program product comprising:
   first program instructions for interrupting an execution of a software program in response to a detection of a profiling event during the execution of the software program;
   second program instructions for recording an event sample associated with the profiling event, wherein the event sample is recorded in the log file, and wherein the log file comprises a set of event samples;
   third program instructions for inserting a set of markers comprising information describing the event sample into the log file, wherein the set of markers are associated with the event sample; and
   fourth program instructions for resuming the execution of the software program.

8. The computer program product of claim 7, wherein the second program instructions and the third program instructions are performed at the same time.

9. The computer program product of claim 7, wherein the event sample comprises one of a description of a program execution location at a time of collection, and a program's process identifier.

10. The computer program product of claim 7, wherein a marker of the set of markers comprises:
    a marker header that identifies the marker as being a marker; and
    a description field describing the event sample with which the marker is associated.

11. The computer program product of claim 10, wherein the description field, comprises:
    a timestamp indicating a date and/or time that the marker was inserted into the log file; and
    an event sample description storing data describing the event sample associated with the marker.

12. A computer implemented method for processing data in a log file, the computer implemented method comprising:
    a computer searching the log file using a set of filtering rules, wherein the log file comprises a set of event samples and a set of markers;
    the computer identifying event samples of the set of event samples from the log file satisfying the set of filtering rules to form selected event samples; and
    the computer generating a processed log file, wherein the processed log file comprises the selected event samples.

13. The computer implemented method of claim 12, wherein identifying event samples of the set of event samples further comprises:
    the computer locating a start marker having a header specified by the set of filtering rules;
    the computer locating a stop marker associated with the start marker; and
    the computer selecting the event samples associated with the start marker and the stop marker to form the selected event samples.

14. The computer implemented method of claim 12, wherein an event sample of the set of event samples comprises one of a description of a program execution location at a time of collection, and a program's process identifier.

15. The computer implemented method of claim 12, wherein the set of filtering rules specifies a type of information included in the set of markers.

16. A computer program product, comprising:
    a non-transitory computer recordable-type medium storing program instructions for processing data in a log file, the computer program product comprising;
    first program instructions for searching the log file using a set of filtering rules, wherein the log file comprises a set of event samples and a set of markers;

second program instructions for identifying event samples of the set of samples from the log file satisfying the set of filtering rules to form selected event samples; and third program instructions for generating a processed log file, wherein the processed log file comprises the selected event samples.

17. The computer program product of claim 16, wherein the second program instructions comprises:

program instructions for locating a start marker having a header specified by the set of filtering rules;

program instructions for locating a stop marker associated with the start marker; and program instructions for selecting the event samples associated with the start marker and the stop marker to form the selected event samples.

18. The computer program product of claim 16, wherein an event sample of the set of event samples comprises one of a description of a program execution location at a time of collection, and a program's process identifier.

19. The computer program product of claim 18, wherein the set of filtering rules specifies a type of information included in the set of markers.

20. A system for generating data in a log file, the system comprising:

a kernel function, wherein the kernel function detects a marking request to initiate collection of a set of event samples; and a post processor, wherein the post processor interrupts an execution of a software program in response to detecting a profiling event during the execution of the software program;

records an event sample associated with the profiling event, wherein the event sample is recorded in the log file, and wherein the log file comprises a set of event samples and a set of markers describing the set of event samples, wherein the set of markers are recorded in the log file with the set of event samples; and resumes the execution of the software program.

21. The system of claim 20, further comprising:

a profile tool, wherein the profile tool generates a report comprising profile characteristics for a data processing system.

22. The system of claim 20, wherein an event sample of the set of event samples comprises one of a description of a program execution location at a time of collection, and a program's process identifier.

23. The system of claim 20, wherein a marker of the set of markers comprises:

a marker header that identifies the marker as being a marker; and a description field describing the event sample with which the marker is associated.

24. The system of claim 23, wherein the description field, comprises:

a timestamp indicating a date and/or time that the marker was inserted into the log file; and an event sample description storing data describing the event sample associated with the marker.

* * * * *